(12) United States Patent
Do et al.

(10) Patent No.: US 10,237,318 B2
(45) Date of Patent: Mar. 19, 2019

(54) ELECTRONIC DEVICE AND METHOD FOR ENCODING IMAGE DATA THEREOF

(71) Applicant: Samsung Electronics Co., Ltd., Gyeonggi-do (KR)

(72) Inventors: Taewon Do, Gyeonggi-do (KR); Kichoon Gong, Seoul (KR); Jinkyu Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 190 days.

(21) Appl. No.: 15/277,486

(22) Filed: Sep. 27, 2016

(65) Prior Publication Data

US 2017/0104804 A1    Apr. 13, 2017

(30) Foreign Application Priority Data

Oct. 13, 2015 (KR) .................. 10-2015-0142934

(51) Int. Cl.
```
H04M 3/42       (2006.01)
H04L 29/06      (2006.01)
H04M 1/725      (2006.01)
H04W 4/50       (2018.01)
H04N 7/14       (2006.01)
```

(52) U.S. Cl.
CPC .......... *H04L 65/602* (2013.01); *H04L 65/80* (2013.01); *H04M 1/72555* (2013.01); *H04M 1/72563* (2013.01); *H04N 7/147* (2013.01); *H04W 4/50* (2018.02); *H04M 1/72519* (2013.01); *H04M 1/72522* (2013.01); *H04M 2250/52* (2013.01)

(58) Field of Classification Search
CPC ........ H04L 29/08108; H04M 2207/18; H04M 1/72519; H04M 1/72522; H04M 1/72525; H04W 4/02; H04W 8/245; H04W 88/02; H04N 7/01; H04N 7/012; H04N 7/0125
USPC ................... 455/414.1, 550.1, 418; 348/441
See application file for complete search history.

(56) References Cited

U.S. PATENT DOCUMENTS

| | | | |
|---|---|---|---|
| 9,420,316 B2 * | 8/2016 | Suneya | H04N 5/775 |
| 9,609,332 B2 * | 3/2017 | Owen | H04N 19/134 |
| 2004/0184531 A1 | 9/2004 | Lim et al. | |
| 2008/0152313 A1 * | 6/2008 | Sakurai | H04N 19/15 386/353 |
| 2013/0222549 A1 * | 8/2013 | Yoon | H04N 13/239 348/47 |

(Continued)

FOREIGN PATENT DOCUMENTS

| | | |
|---|---|---|
| KR | 100537305 | 12/2005 |
| KR | 100615384 | 8/2006 |

(Continued)

*Primary Examiner* — Danh C Le
(74) *Attorney, Agent, or Firm* — The Farrell Law Firm, P.C.

(57) ABSTRACT

Methods and devices for image data encoding are provided. Image data is created using at least one image captured by a camera of the electronic device. First encoded image data is created by encoding at least a portion of the image data in a first manner. Second encoded image data is created by encoding the at least a portion of the image data in a second manner. The second manner is different from the first manner. The first encoded data is stored in a memory of the electronic device. The second encoded data is transmitted from the electronic device to an external device.

18 Claims, 11 Drawing Sheets

(56) References Cited

U.S. PATENT DOCUMENTS

| | | | |
|---|---|---|---|
| 2014/0063183 A1* | 3/2014 | Roh | H04N 19/597 348/42 |
| 2014/0368671 A1* | 12/2014 | Watanabe | H04N 5/272 348/207.1 |
| 2015/0042878 A1* | 2/2015 | Jeon | H04N 19/59 348/441 |
| 2016/0078608 A1* | 3/2016 | Na | G06T 7/001 382/149 |
| 2016/0134875 A1* | 5/2016 | Yamaguchi | H04N 19/172 375/240.01 |
| 2017/0094311 A1* | 3/2017 | Chou | H04N 19/53 |

FOREIGN PATENT DOCUMENTS

| | | |
|---|---|---|
| KR | 100822994 | 4/2008 |
| KR | 1020100087954 | 8/2010 |
| KR | 1020120016518 | 2/2012 |

\* cited by examiner

ELECTRONIC DEVICE AND METHOD FOR ENCODING IMAGE DATA THEREOF

PRIORITY

This application claims priority under 35 U.S.C. § 119(a) to Korean Patent Application Serial No. 10-2015-0142934, which was filed in the Korean Intellectual Property Office on Oct. 13, 2015, the disclosure of which is incorporated herein by reference.

BACKGROUND

1. Field of the Disclosure

The present disclosure relates generally to an electronic device, and more particularly, to an image data encoding method of the electronic device.

2. Description of the Related Art

An electronic device, such as a mobile communication terminal, has been continually developed to meet a variety of user's demands. The development of hardware technologies and mobile communication technologies allows a real-time video call between electronic devices, and further allows a real-time transmission of image data having a resolution of 1280*720 (also referred to as 720p) or more.

When a video call is established between electronic devices, the electronic device may acquire user's image data through a camera module equipped therein, encode the acquired image data, and transmit the encoded image data to other electronic device through a network. Such a real-time video call may be performed between both parties or among multiple parties. In this case, the electronic device may synchronize image data with voice data and then transmit compressed streams to other electronic device(s).

For a real-time transmission of the acquired image data to another electronic device, the electronic device may encode the acquired image data with a suitable quality for a network environment. For example, in a poor network environment, the electronic device may apply quality of service (QoS) in real time and encode an image with a lower resolution.

When recording the acquired image data in real time, a typical electronic device stores the image data, which is to be transmitted to the other electronic device, in a memory as is. Further, when initiating such a recording in a real-time bidirectional video call, the typical electronic device stores, as a file, compressed streams of image data received from the other electronic device. Thus, when a network environment is poor, the typical electronic device has no choice but to store an image encoded with a lower quality in the memory.

SUMMARY

The present disclosure has been made to address at least the above problems and/or disadvantages and to provide at least the advantages described below. Accordingly, an aspect of the present disclosure provides an electronic device and image data encoding method capable of recording high-quality image data without depending on network environments when transmitting acquired image data to another electronic device in real time and also storing the acquired image data.

According to an aspect of the present disclosure, an electronic device is provided that includes a housing, a camera disposed in the housing and configured to capture an image and create image data, and an encoder disposed in the housing and configured to encode at least a portion of the image data. The electronic device also includes a communication circuit disposed in the housing and configured to perform communication with an external device, a processor disposed in the housing and electrically connected with the camera, the encoder, and the communication circuit, and a nonvolatile memory disposed in the housing and electrically connected with the processor. The encoder is further configured to create first encoded image data by encoding the at least a portion of the image data in a first manner, and to create second encoded image data by encoding the at least a portion of the image data in a second manner. The second manner is different from the first manner. The memory stores instructions, which when executed, cause the processor to store the first encoded data in the memory and to transmit the second encoded data to the external device through the communication circuit.

According to another aspect of the present disclosure, an image data encoding method in an electronic device is provided. Image data is created using at least one image captured by a camera of the electronic device. First encoded image data is created by encoding at least a portion of the image data in a first manner. Second encoded image data is created by encoding the at least a portion of the image data in a second manner. The second manner is different from the first manner. The first encoded data is stored in a memory of the electronic device. The second encoded data is transmitted from the electronic device to an external device.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
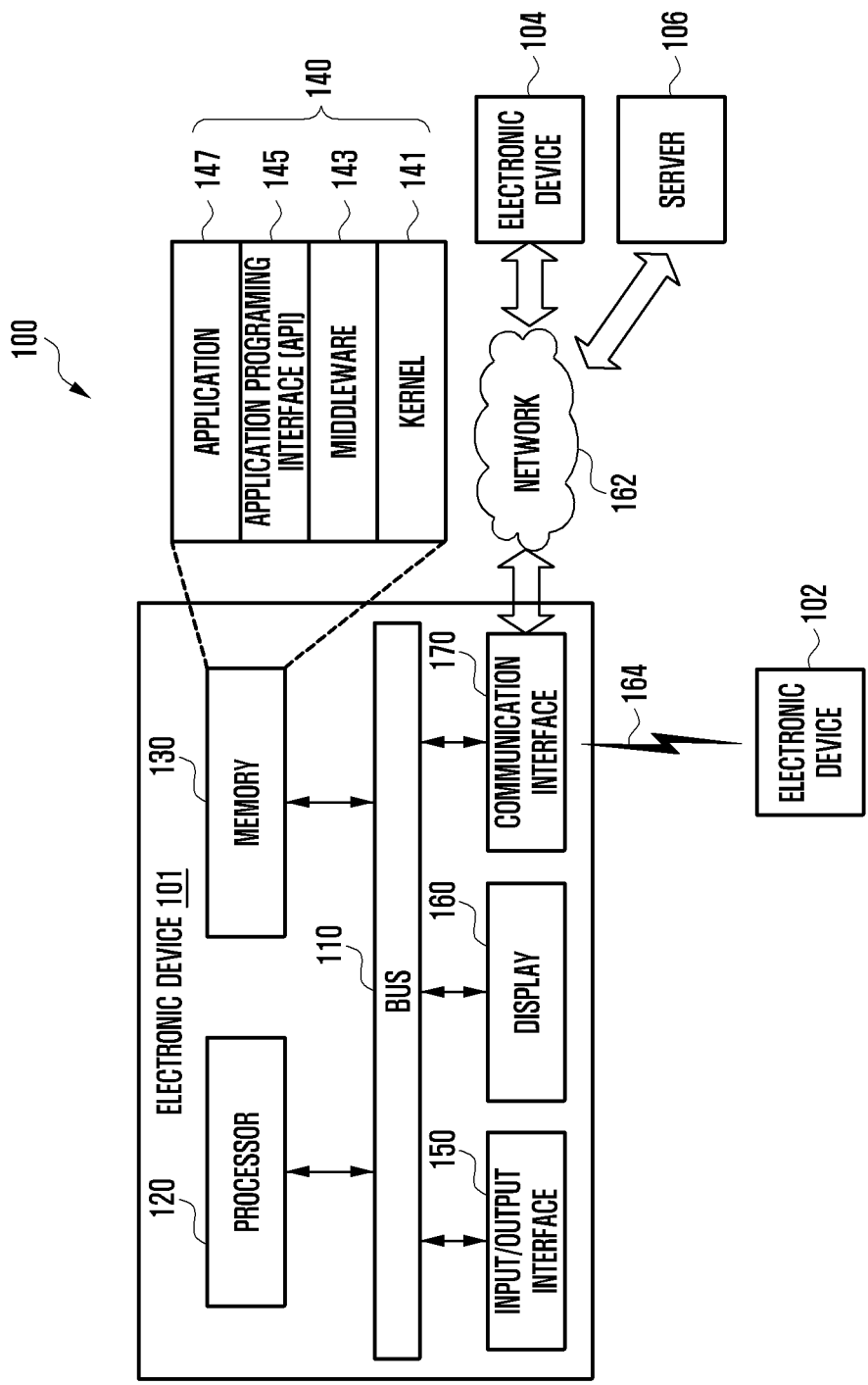
FIG. 1 is a diagram illustrating a network environment, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The expressions "comprising" and "may comprise", as used herein, indicate the presence of a corresponding function, operation, or element and do not limit additional functions, operations, or elements. Further, the terms "comprise" and "have" indicate the presence of a characteristic, numeral, step, operation, element, component, or combination thereof and do not exclude the presence or addition of at least one other characteristic, numeral, step, operation, element, component, or combination thereof.

Herein, the expression "or" includes any combination or the entire combination of together listed words. For example, "A or B" may include A, B, or A and B.

The expressions of "a first" and "a second", used herein, may represent various elements of the present disclosure, but do not limit corresponding elements. For example, the expression does not limit the order and/or importance of corresponding elements. The expression may be used for distinguishing one element from another element. For example, both a first user device and a second user device are user devices and represent different user devices. Additionally, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used herein are not intended to limit the present disclosure but to illustrate embodiments. When used in the present disclosure and the appended claims, a singular form includes plural forms unless it is explicitly differently represented.

Unless differently defined, entire terms, including a technical term and a scientific term, used herein have the same meanings as those that may be generally understood by a person of common skill in the art. It should be understood that generally used terms defined in a dictionary have a meaning corresponding to that of the context of related technology and are not to be analyzed in an ideal or excessively formal meaning unless explicitly defined.

Herein, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a digital versatile disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, etc.), a navigation device, a global position system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram illustrating an electronic apparatus, according to an embodiment of the present disclosure.

Referring to FIG. 1, an electronic apparatus 101 includes a bus 110, a processor 120, a memory 130, a user input module 150, a display 160, and a communication interface 170.

The bus 110 may be a circuit for interconnecting elements described above and for allowing a communication, for example, by transferring a control message, between the elements described above.

The processor 120 can receive commands from the above-described other elements (e.g. the memory 130, the user input module 150, the display 160, and the communication interface 170), through, for example, the bus 110, can decipher the received commands, and perform operations and/or data processing according to the deciphered commands.

The memory 130 can store commands received from the processor 120 and/or other elements (e.g. the user input module 150, the display 160, and the communication interface 170), and/or commands and/or data generated by the processor 120 and/or other elements. The memory 130 includes software and/or programs 140, such as a kernel 141, middleware 143, an application programming interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function that allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish communication between the electronic apparatus 101 and other electronic devices (e.g., a first external electronic device 102, a second external electronic device 104, and/or a server 106. The communication interface 170 can support short range communication protocols, such as, for example, a wireless fidelity (WiFi) protocol, a BlueTooth (BT) protocol, and a near field communication (NFC) protocol, communication networks, such as, for example, Internet, a local area network (LAN), a wide area network (WAN), a telecommunication network, a cellular network, and a satellite network, or a plain old telephone service (POTS), or any other similar and/or suitable communication networks, such as network 162, or the like. Each of the first external electronic device 102 and the second external electronic device 104 may be a same type and/or different types of electronic apparatus.

Figure 2:
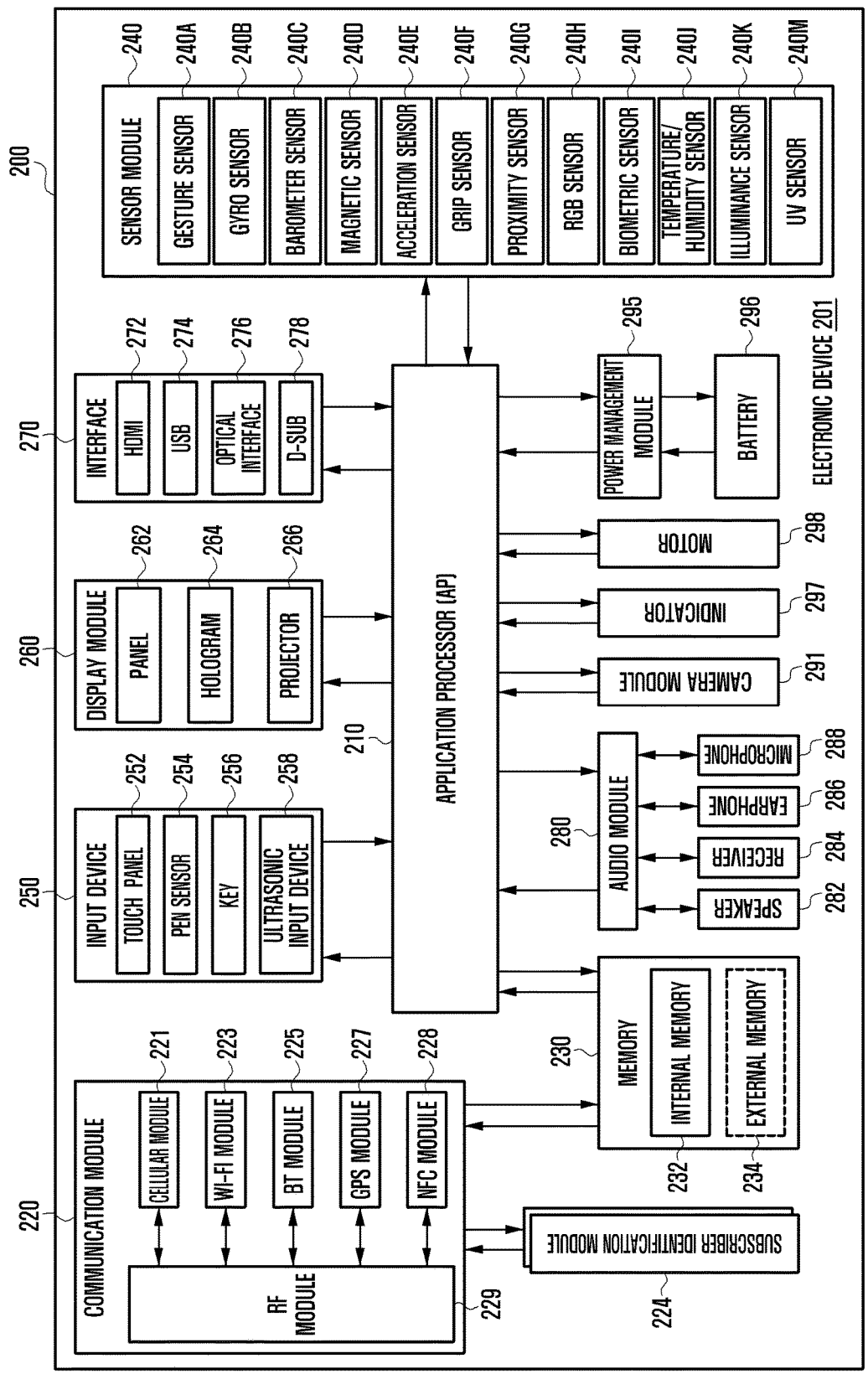
FIG. 2 is a block diagram illustrating an electronic device, according to an embodiment of the present disclosure.

FIG. 2 is a block diagram illustrating an electronic device, according to an embodiment of the present disclosure. An electronic device 201 may form, for example, the whole or part of the electronic device 101 of FIG. 1. Referring to FIG. 2, the electronic device 201 includes at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operations for various data including multimedia data. The AP 210 may be formed as a system-on-chip (SoC), for example. According to an embodiment, the AP 210 may further include a graphic processing unit (GPU).

The communication module 220 (e.g., the communication interface 170 of FIG. 1) may perform a data communication with any other electronic device (e.g., the second external electronic device 104 or the server 106 of FIG. 1) connected to the electronic device 200 (e.g., the electronic device 100 of FIG. 1) through the network. According to an embodiment, the communication module 220 includes therein a cellular module 221, a WiFi module 223, a BT module 225, a GPS module 227, an NFC module 228, and a radio frequency (RF) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed as an SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single integrated circuit (IC) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. The RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be inserted into a slot formed at a certain place of the electronic device 201. The SIM card 224 may contain therein an integrated circuit card identifier (ICCID) or an international mobile subscriber identity (IMSI).

The memory 230 (e.g., the memory 130 of FIG. 1) includes at least one of an internal memory 232 and an external memory 234. The internal memory 232 may include, for example, at least one of a volatile memory (e.g., dynamic random access memory (RAM) (DRAM), static RAM (SRAM), synchronous DRAM (SDRAM), etc.) or a nonvolatile memory (e.g., programmable read only memory (ROM) (PROM), one time PROM (OTPROM), erasable PROM (EPROM), electrically erasable PROM (EEPROM), mask ROM, flash ROM, NAND flash memory, NOR flash memory, etc.).

According to an embodiment, the internal memory 232 may have the form of a solid state drive (SSD). The external memory 234 may include a flash drive, e.g., compact flash (CF), secure digital (SD), Micro-SD, Mini-SD, extreme digital (xD), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 includes, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input device 250 includes at least one of a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 160 of FIG. 1) includes at least one of a panel 262, a hologram 264, or a projector 266. The panel 262 may be, for example, liquid crystal display (LCD), active matrix organic light emitting diode (AM-OLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 includes, for example, at least one of a high-definition multimedia interface (HDMI) 272, a universal serial bus (USB) 274, an optical interface 276, or a D-subminiature (D-sub) 278. The interface 270 may be contained, for example, in the communication interface 260 shown in FIG. 2. Additionally or alternatively, the interface 270 may include, for example, a mobile high-definition link (MHL) interface, an SD card/multimedia card (MMC) interface, or an infrared data association (IrDA) interface.

The audio module 280 may perform a conversion between sounds and electric signals. The audio module 280 may process sound information inputted or outputted through a speaker 282, a receiver 284, an earphone 286, or the microphone 288.

The camera module 291 is a device capable of obtaining still images and moving images. According to an embodiment, the camera module 291 may include at least one image sensor (e.g., a front sensor or a rear sensor), a lens, an image signal processor (ISP), or a flash (e.g., LED or xenon lamp).

The power management module 295 may manage electric power of the electronic device 201. Although not shown, the power management module 295 may include, for example, a power management integrated circuit (PMIC), a charger IC, or a battery gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. The electronic device 201 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-described elements without some elements or with additional other elements. Some of the elements may be integrated into a single entity that still performs the same functions as those of such elements before integrated.

The term "module", as used herein, may refer to a certain unit that includes one of hardware, software, firmware, or any combination thereof. The term "module" may be interchangeably used with the terms "unit", "logic", "logical block", "component", or "circuit", for example. A module may be the minimum unit, or part thereof, which performs one or more particular functions. A module may be formed mechanically or electronically. For example, the module disclosed herein may include at least one of application-specific integrated circuit (ASIC) chip, field-programmable gate arrays (FPGAs), and programmable-logic device, which are known or are to be developed.

Figure 3:
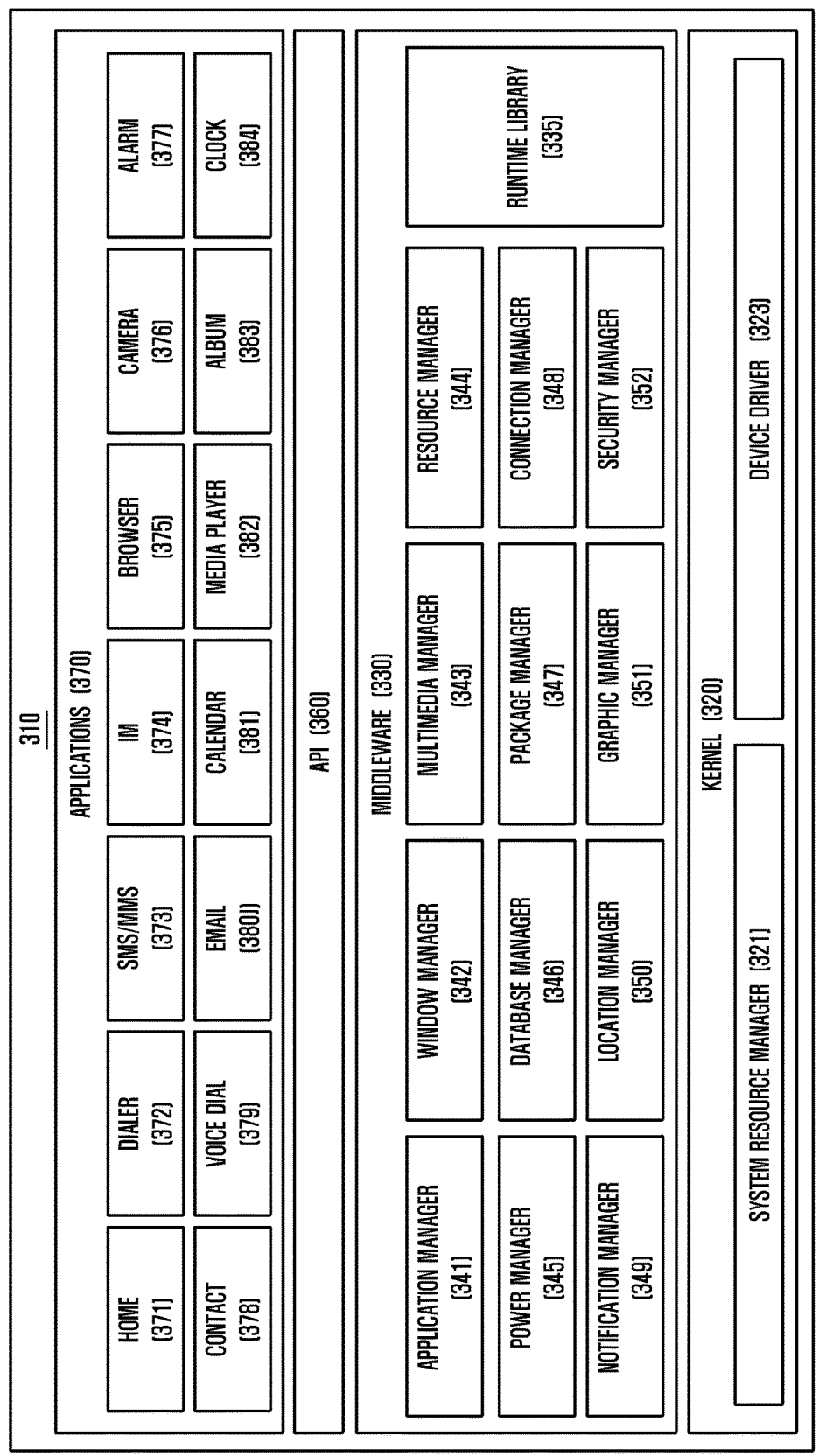
FIG. 3 is a block diagram illustrating a program module, according to an embodiment of the present disclosure.

FIG. 3 is a block diagram illustrating a configuration of a programming module, according to an embodiment of the present disclosure.

A programming module 310 may be included (or stored) in the electronic device 200 (e.g., the memory 230) of FIG. 2 or may be included (or stored) in the electronic device 100 (e.g., the memory 130) of FIG. 1. At least a part of the programming module 310 may be implemented in software, firmware, hardware, or a combination of two or more thereof. The programming module 310 may be implemented in hardware, and may include an operating system (OS) controlling resources related to an electronic device (e.g., the electronic device 100 or 200) and/or various applications (e.g., an application 370) executed in the OS.

Referring to FIG. 3, the programming module 310 may include a kernel 320, a middleware 330, an API 360, and/or the application 370.

The kernel 320 includes a system resource manager 321 and/or a device driver 323. The system resource manager 321 may include, for example, a process manager, a memory manager, and a file system manager. The system resource manager 321 may perform the control, allocation, recovery, and/or the like of system resources. The device driver 323 may include, for example, a display driver, a camera driver, a Bluetooth driver, a shared memory driver, a USB driver, a keypad driver, a Wi-Fi driver, and/or an audio driver. Also, according to an embodiment of the present disclosure, the device driver 323 may include an inter-process communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 200) has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 is a set of API programming functions, and may be provided with a different configuration according to an OS. For example, one API set may be provided to each platform, or two or more API sets may be provided to each platform.

The applications 370 may include, for example, a preloaded application and/or a third party application. The applications 370 (e.g., the applications 247) include, for example, a home application 371, a dialer application 372, a short message service (SMS)/multimedia messaging service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

Figure 4:
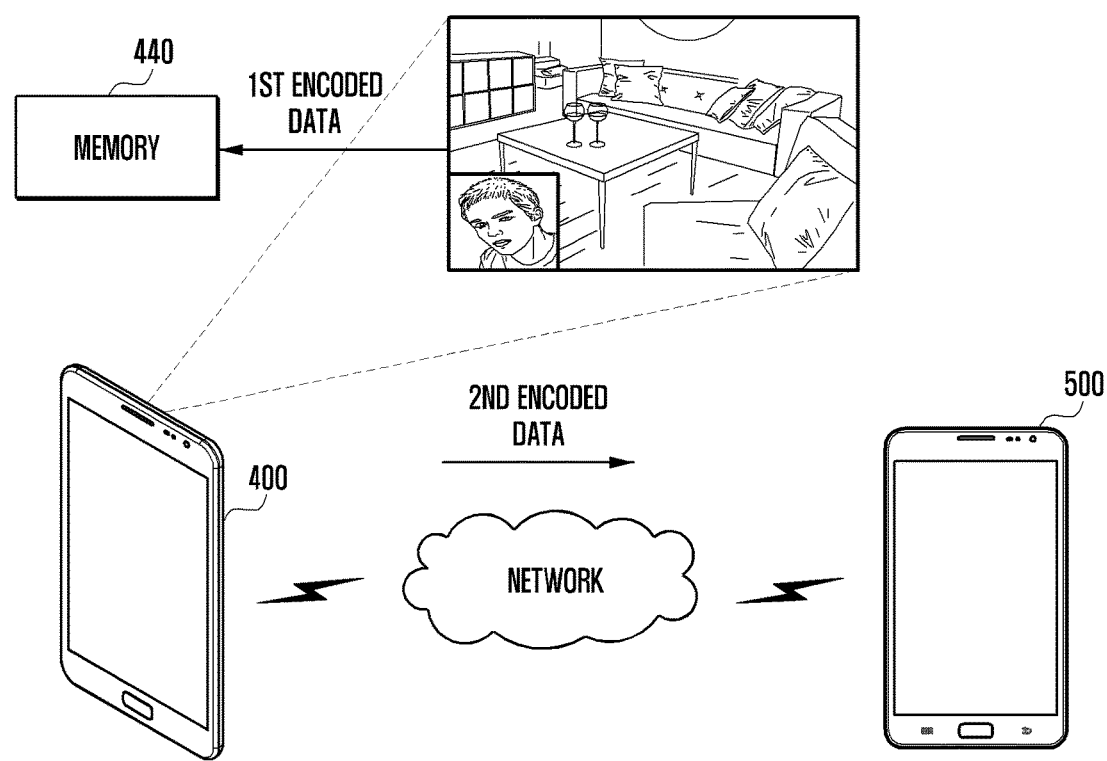
FIG. 4 is a diagram illustrating a real-time image transmission system, according to an embodiment of the present disclosure.

FIG. 4 is a diagram illustrating a real-time image transmission system, according to an embodiment of the present disclosure.

As shown in FIG. 4, an electronic device 400 and an external device 500 may connect a voice call and/or a data call through a network, and transmit/receive voice data and/or multimedia data. The electronic device 400 may include at least part of elements of the electronic device 100 in FIG. 1 or of the electronic device 200 in FIG. 2. The electronic device 400 may be, but is not limited to, a smart phone, a tablet personal computer, a mobile phone, or the like. The external device 500 may be, for example, an electronic device including the same elements as those of the electronic device 400.

The electronic device 400 may access the network through a cellular communication protocol such as, but not limited to, long term evolution (LTE) or wideband code division multiple access (WCDMA) or through WiFi and then transmit multimedia data to the external device 500. In this case, such multimedia data may be transmitted to the external device 500 through a server device equipped in the network. Additionally, the electronic device 400 may directly transmit multimedia data to the external device 500 through a short range communication protocol such as, but not limited to, Bluetooth, NFC, or the like.

The electronic device 400 has at least one camera on the front side and/or the rear side and may capture subjects through the camera. If the electronic device 400 has two or more cameras, the electronic device 400 may synchronize and mix images captured by respective cameras and thereby create a single image data. The camera in the electronic device 400 may store the captured image in the form of digital data. The electronic device 400 may select a resolution and/or a frame rate of the captured image data on the basis of a user's setting through an option menu, a network environment, or a default setting.

The captured image data is stored for recording in the memory of the electronic device 400 and may be transmitted to the external device 500 in real time through the network. The captured image data, captured and created through the camera, may be encoded by using a video codec when stored in the memory of the electronic device 400 or transmitted to the external device 500 since raw data thereof has a great size.

The electronic device 400 may compress the image data at a target bit-rate (kbps) determined in real time by a rate control. If the target bit-rate is greater than a network bandwidth, any delay of transmission may occur due to limitations of bandwidth in a network environment. Thus, for a real-time transmission of a high-quality image data, the electronic device 400 may compress the image data according to a QoS algorithm at a suitable target bit-rate for the network environment with the limited bandwidth.

According to various embodiments of the present disclosure, the electronic device 400 may encode the image data with two or more threads (or processes) independently. After acquiring the captured image data, the electronic device 400 may process (e.g., change a resolution, change a frame rate, etc.) the image data according to a QoS algorithm in case of transmission, and also process the image data according to a user's selected recording option or record the image data with only a changed encoder parameter in case of recording. In such cases, the electronic device 400 may simultaneously or sequentially encode two image data, respectively. As such, processes in which the electronic device 400 independently encodes using a hardware or software encoder will be referred to as a first encoding and a second encoding, respectively. The first encoded data for recording may be stored in the memory, and the second encoded data for transmission may be transmitted to the external device 500. The first and second encoding processes may be different from each other in at least one of a resolution, a frame rate, and a compression ratio.

The encoding of image data may be performed by a hardware encoder and/or a software encoder included in the electronic device 400. When using the hardware encoder, a single encoder may simultaneously or sequentially create the first encoded data and the second encoded data through a multi-thread operation, or a plurality of encoders may create respectively the first encoded data and the second encoded data.

The above-described image capturing, image data encoding, storing in the memory, and transmitting to the external device 500 may be initiated while a voice call is performed. For example, if a user presses a specific button while the electronic device 400 performs a voice call with the external device 500, the electronic device 400 may request the connection of a separate data call. When the data call is connected, the electronic device 400 may transmit the image data to the external device 500. Further, even in case of a video call, various embodiments of the present disclosure may be also applied.

Sharing the image data between or among users during a call requires a real-time transmission of image data without buffering and also requires a higher bandwidth. Thus, when the network environment (especially, uplink) is poor, the electronic device 400 may consider QoS in real time and thereby change parameters for an input image or parameters for encoder setting values when creating the second encoded data (i.e., the encoded data for transmission). Herein, parameters for an input image may include a resolution and a frame rate, and parameters for encoder setting values may be for example a compression ratio (or bit per second (bps)).

As described above, when the network environment is poor, the electronic device 400 may create the first encoded data by applying a high-quality parameter, and may further create the second encoded data by applying a low-quality parameter. In various embodiments, the first encoded data may be stored in the electronic device 400 without being affected by transmission. Therefore, even in communication network environments having limited bandwidths, this present disclosure advantageously allows real-time recording of a very high-quality image in a state of call connection.

Various embodiments regarding the electronic device 400 will be described in detail with reference to FIG. 5.

Figure 5:
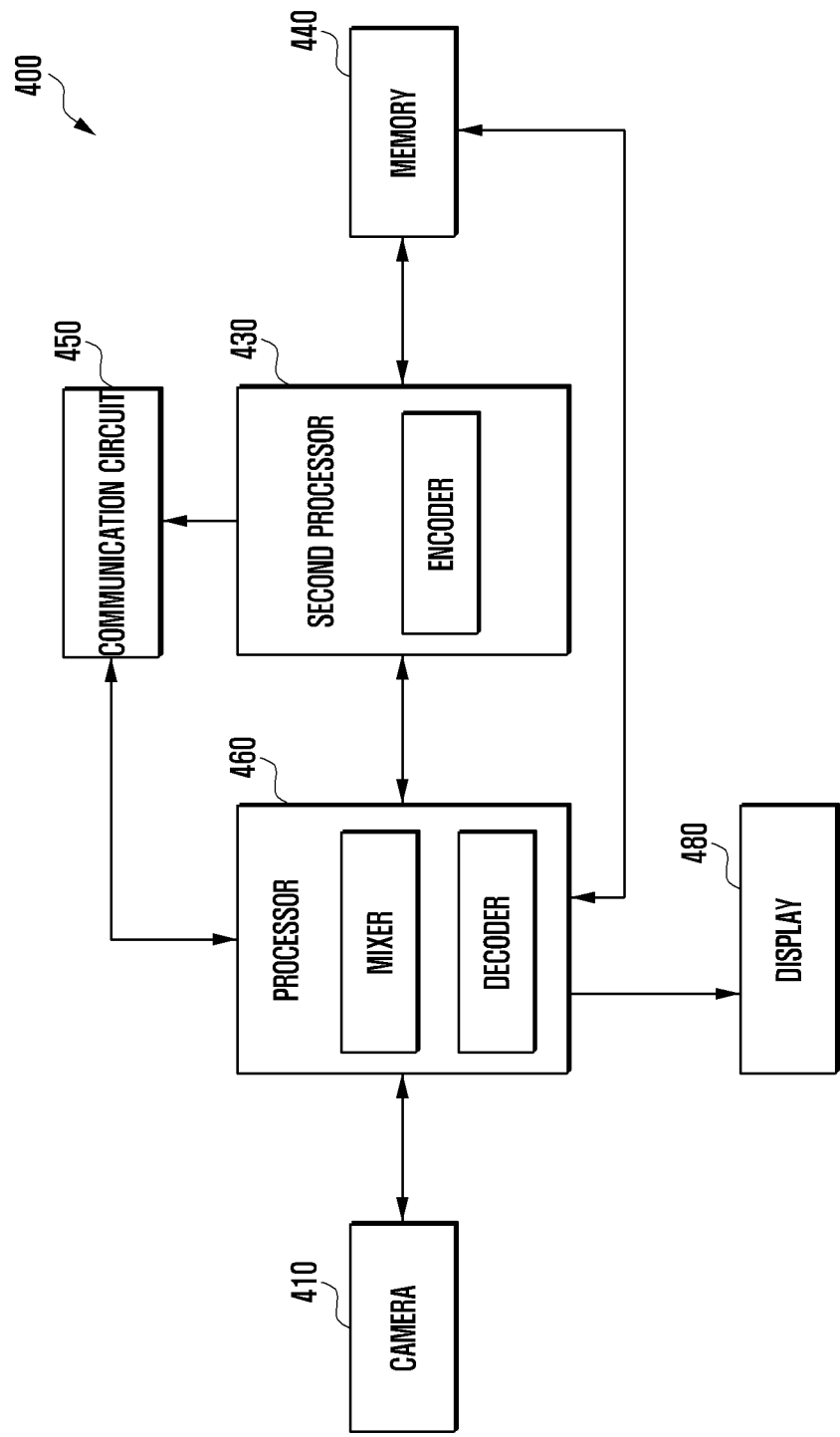
FIG. 5 is a block diagram illustrating an electronic device, according to an embodiment of the present disclosure.

FIG. 5 is a block diagram of an electronic device, according to an embodiment of the present disclosure.

As shown in FIG. 5, an electronic device 400 includes a camera 410, a processor 460, a communication circuit 450, a memory 440, a second processor 430, and a display 480. These elements may be disposed within a housing and at least part thereof may be exposed from a part of the housing. In various embodiments, some elements of the electronic device 400 shown in FIG. 5 may be omitted or replaced with equivalent elements. Also, any element may be added selectively or inherently to the electronic device 400.

The processor 460 may perform a function to drive an operation system or an application and then control respective elements disposed in or connected with the electronic device 400. The processor 460 may include various kinds of processors such as a central processing unit (CPU), an AP, and/or a CP. The processor 460 may be disposed within the housing.

The processor 460 may execute instructions stored in the memory 440 and thereby perform a variety of operations. Unless otherwise described hereinafter, the operations of the processor 460 may be performed by the instructions stored in the memory 440. The processor 460 may be electrically connected with internal elements of the electronic device 400, such as the camera 410, the communication circuit 450, the second processor 430, the memory 440, and the display 480.

The processor 460 may perform functions of an encoder, a decoder, and a mixer. The encoder and the decoder may be implemented with software or a separate hardware chip. For example, the encoder may be implemented as a software encoder and operated by the processor 460. In another example, a certain hardware chip (e.g., the second processor 430) may perform the function of the encoder. Various embodiments of the present disclosure may encode the image data separately in two manners. Namely, the electronic device 400 may perform one of the first and second encodings through hardware encoding by the second processor 430 and also perform the other of the first and second encodings through software encoding by the processor 460. Alternatively, the electronic device 400 may separately perform the first and second encodings by using only one of the processor 460 and the second processor 430.

The processor 460 may perform a function to mix different images and thereby create a single image data. For example, the camera 410 may be composed of first and second cameras respectively equipped on the rear and front sides of the electronic device 400 and capture simultaneously rear and front images through the first and second cameras. The mixer may receive such images captured by the first and second cameras and then synchronize and mix the received images to acquire a single image data. Additionally, the mixer may mix any external image data, received from the external device 500, with an image captured by the electronic device 400.

In a picture-in-picture (PiP) mode, the mixer may mix a rear image captured by the first camera as an original image and a front image captured by the second camera as an additional image. According to various embodiments, any image received from the external device 500 may be mixed as an additional image.

Further, the processor 460 may synchronize the mixed image with a user's voice input data.

The camera 410 may capture subjects and create image data. The camera 410 may include at least part of the camera module 291 shown in FIG. 2. The camera 410 may be arranged so as to be exposed through a part of the housing.

The camera 410 may include a plurality of cameras. Although two cameras are used in embodiments disclosed herein, this is exemplary only and not to be considered as a limitation. In this disclosure, the camera equipped on the rear side will be referred to as the first camera, and the camera equipped on the front side will be referred to as the second camera.

The camera 410 may include an analog-to-digital (A/D) converter which can convert analog information of the captured image to digital data. In this disclosure, an image converted into digital data will be referred to as image data. Additionally, the camera 410 may include one or more image sensors (e.g., a front sensor and/or a rear sensor), a lens, an ISP, a flash (e.g., an LED, a xenon lamp, etc.), and any other well-known component of the camera module.

The camera 410 may acquire a still image or a moving image (i.e., video). In the case of video, the camera 410 may set a resolution and a frame rate. For example, the camera 410 may select a resolution among a full high-definition (FHD) of 1920*1080, a high-definition (HD) of 1280*720, a video graphics array (VGA) of 640*480, and the like, and select a frame rate among 24 frame per second (fps), 25 fps, 30 fps, and the like. Herein, the resolution and the frame rate may be set as a default value or changed by a user through an option menu. Further, when images are transmitted to the network in real time, the resolution and the frame rate may be varied in real time according to a QoS algorithm based on the network environment.

The communication circuit 450 is an element configured to communicate with the external device 500 through a wired or wireless network. The communication circuit 450 may include at least part of the communication interface 170 shown in FIG. 1 and/or the communication module 220 shown in FIG. 2. The communication circuit 450 is arranged inside the housing and may be electrically connected with internal elements of the electronic device 400 such as the processor 460, the second processor 430, and the like.

The memory 440 performs a function to store data and may include at least part of the memory 130 shown in FIG. 1 and/or the memory 230 shown in FIG. 2. The memory 440 may include at least one volatile memory and/or at least one non-volatile memory so as to temporarily or permanently store image data, first encoded data, and second encoded data. The memory 440 may store information about a capture quality of the camera 410 (e.g., a resolution, a frame rate, etc.), a recording quality (e.g., a resolution, a frame rate, a compression ratio, etc. of first encoded data), and a transmission quality (e.g., a resolution, a frame rate, a compression ratio, etc. of second encoded data), which may be applied according to user's setting and/or network environments. The memory 440 may include a non-volatile memory embedded in the electronic device 400 or an external memory capable of being connected with the electronic device 400 through various interfaces.

The display 480 performs a function to display an image and may include at least part of the display module 260 shown in FIG. 2.

The second processor 430 is a processor performing operations that are different from those of the processor 460, and may include a hardware encoder and decoder. As described above, the electronic device 400 may encode the image data through a hardware encoder and/or a software encoder, and the second processor 430 may include a hardware encoder. In an embodiment, the first encoding may be performed by the hardware encoder included in the second processor 430, and the second encoding may be performed by the software encoder executed by the processor 460. In another embodiment, both the first encoding and the second encoding may be performed by the second processor 430. In this case, the first encoding and the second encoding may use different algorithms according to different compression ratios supported by the second processor, and also may be performed separately in multi thread. In still another embodiment, both the first encoding and the second encoding may be performed by the processor 460, and the second processor 430 may be omitted.

The electronic device 400 may create the first encoded data by encoding at least part of an image, captured by the camera 410, in a first manner, and similarly create the second encoded data by encoding at least part of the capture image in a second manner. Herein, the first and second manners may be at least partially different from each other. For example, when image data is encoded in the first and second manner, at least one encoding parameter such as a resolution, a frame rate, or a compression ratio may be different. Further, a video codec applied to the first and second manners may be different. For example, one of the first and second manners may use H.264/AVC, and the other may use H.263 or HEVC(H.265). In this case, encoding (or decoding) algorithms may also be different according to the used codec. Further, in the first and second manners, detailed parameters of encoding such as Video Min quantization parameter (QP), Rate Control type, GoP Size (I frame interval), Profile/Level, the number of encoder-allocated buffers, CAVAC, RefFrame number, etc. may be set differently.

According to various embodiments, the first encoded data may be stored in the memory 440, and the second encoded data may be transmitted to the external device 500 through the network from the communication circuit 450.

According to various embodiments, the first encoded data may have a first quality and the second encoded data may have a second quality, wherein the second quality may be lower than the first quality. The first quality and the second quality are a parameter associated with an input image and a parameter for encoder setting values, respectively. For example, the first quality may include at least one value of a first resolution, a first frame rate, and a first compression ratio, and the second quality may include at least one value of a second resolution, a second frame rate, and a second compression ratio.

According to various embodiments, the first quality may be a predetermined value selected by a user. For example, a user may select the first quality to encode the captured image data with a HD resolution and a frame rate of 25 fps. In this case, the processor 460 and/or the second processor 430 may change the image data, received from the camera 410, to have a HD resolution and a frame rate of 25 fps. Further, by applying a compression ratio according to user's setting, the first encoded data may be obtained. The electronic device 400 may provide an option menu for allowing a user to select the first quality. The option menu may allow a user to directly enter a desired value regarding a resolution, frame rate, etc., and/or allow a user to select one of predetermined levels such as a ultra high quality, a high quality, and a normal quality, each of which defines in advance parameters such as a resolution, a frame rate, and the like.

According to various embodiments, the second quality may be determined on the basis of network information of a data call. As described above, when there is a user's request for transmission of captured images while a voice call is performed, the electronic device 400 may create image data by activating the camera 410, request the connection of a data call with the external device 500, and transmit the second encoded data to the external device 500 through the communication circuit 450.

Since the communication circuit 450 of the electronic device 400 can support the wireless communication, the network environment may be frequently changed. For example, when the communication circuit 450 and the network support LTE and WCDMA having lower throughput than LTE, the network environment may be deteriorated due to handover from LTE to WCDMA when a voice call is initiated. Additionally, noises caused by various reasons may degrade data transmission performance.

The processor 460 may determine the second quality by applying a QoS algorithm in real time on the basis of network information. The network information may include uplink data throughput, i.e., an uplink data transmission rate, of the electronic device 400.

A user can select a desired transmission service quality (e.g., one of high, mid, and low) through the option menu and, when a data call is connected, the electronic device 400 may determine the second quality on the basis of the initially selected transmission service quality. Thereafter, the electronic device 400 may receive network information from the network, and the processor 460 may change the second quality in real time on the basis of the received network information. The second quality may have a lower value than that of the first quality in at least one of a resolution, a frame rate, and a compression ratio.

The electronic device 400 may transmit data on uplink to the network according to a real-time protocol (RTP), receive a real-time transport control protocol (RTCP) message from the network, and recognize the network information through the RTCP message.

For example, if any image data created by the camera 410 has an FHD resolution and a frame rate of 30 fps and if a user sets the transmission service quality as high, the encoder of the processor 460 and/or the second processor 430 may create the second encoded data by applying a low compression ratio to the image having an FHD resolution and a frame rate of 30 fps. The communication circuit 450 may check the network information in the RTCP message during the transmission of the second encoded data and, if the network environment is not good, the processor 460 may set each parameter of the second quality as a lower value. Therefore, the encoder may create the second encoded data having a lower quality, for example, by changing a resolution from FHD to HD, changing a frame rate from 30 fps to 24 fps, increasing a compression ratio (i.e., increasing bps), and applying intra-frame (I frame) refresh. Thereafter, when the network environment gets better, the processor 460 may reset the second quality with a high value.

According to various embodiments, the electronic device 400 may allow a bidirectional video call, and the decoder of the processor 460 and/or the second processor 430 may decode external image data received from the external device 500.

The processor 460 may mix the image data, created by the camera 410, with the external image data, and the display 480 may display the mixed image. The processor 460 may change at least one of a resolution and a frame rate of the image data depending on the first quality and/or the second quality.

The processor 460 may mix the image data, having the changed resolution and frame rate, with the external image data received from the external device 500, and control the mixed image to be displayed on the display 480. The processor 460 may set a parameter associated with the captured image data to be entered to the mixer, depending on user's setting. For example, if a user sets an image to be displayed with the same image quality as an image to be displayed on the external device 500, the processor 460 may mix the image data encoded according to the second quality with the received external image data. If a user sets an image to be displayed with the same image quality as an image to be stored in the memory 440, the processor 460 may mix the image data encoded according to the first quality with the received external image data.

The processor 460 may store the first encoded data in the memory 440 and control the second encoded data to be transmitted to the external device 500 through the communication circuit 450. Therefore, the image data to be transmitted to the external device 500 may have a quality determined in real time through a QoS algorithm depending on the network environment, thus allowing seamless transmission. Additionally, the image data to be stored in the memory 440 may have a higher quality (e.g., higher resolution and frame rate) selected by a user regardless of the network environment.

Operations of encoding the image data, storing the encoded data in the memory 440, and transmitting the encoded data to the external device 500 by the electronic device 400, are described in greater detail below.

When the camera 410 captures a subject and creates image data, the processor 460 may perform a pre-processing, such as resolution resizing, FPS adjusting, etc., and then perform the first encoding of the image data by applying parameters determined depending on the first quality. In this case, elementary stream (ES) data compressed by the first encoding may have intra coded pictures (I pictures) being relatively greater in number than predictive coded pictures (P pictures). The processor 430 may store the compressed ES data per picture in a buffer and then store, using fwrite, as a recoding file in the memory 440 when the buffer (e.g., having a size of 2M byte) is full. The first encoded data may be stored in the memory 400 by being multiplexed with voice data and also stored as a file format such as MP4.

Independently from the above operation of storing the first encoded data in the memory 440, the electronic device 400 may perform a pre-processing of the image data to meet a transmission purpose depending on network information (e.g., QoS feedback) and then perform the second encoding of the image data by applying parameters determined depending on the second quality. In this case, compressed ES data may have I pictures being considerably greater in number than P pictures. The processor 430 may packetize the second encoded data for transmission in two modes depending on a unit size of the compressed ES data per picture. For example, if the compressed data is smaller in number, like P picture, packetizing may be performed in a single network abstraction layer (NAL) mode. If the compressed data is greater in number, like I picture, packetizing may be performed in an FU-A mode in which streams are divided in a smaller unit. Thereafter, the processor 430 may perform a forward error correction (FEC) algorithm and encryption of respective packets and then transmit them to the network.

FIGS. 6A to 6D are diagrams illustrating a screen displayed on an electronic device, according to an embodiment of the present disclosure.

Figure 6A:
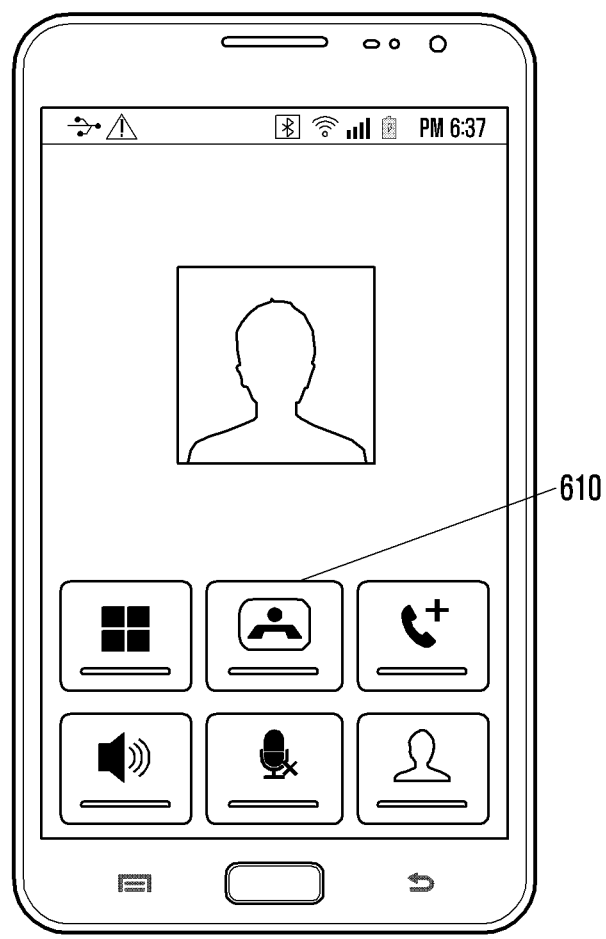
FIGS. 6A to 6D are diagrams illustrating a screen displayed on an electronic device, according to an embodiment of the present disclosure.

FIG. 6A illustrates the screen displayed on the display 480 when a voice call is connected. This screen may vary depending on the embodiment.

As shown in FIG. 6A, the processor 460 may control the display 480 to display a key 610 capable of unidirectional or bidirectional transmission of image data when a voice call is connected with the external device 500. If a user presses the key 610 during the voice call, the electronic device 400 may request the connection of a data call for unidirectional or bidirectional transmission/reception of image data with the external device 500, which is the other party of the voice call. The processor 460 may create the image data by activating the camera 410, encode the created image data in the above-discussed second manner based on a QoS algorithm, and transmit the encoded image data to the external device 500.

Figure 6B:
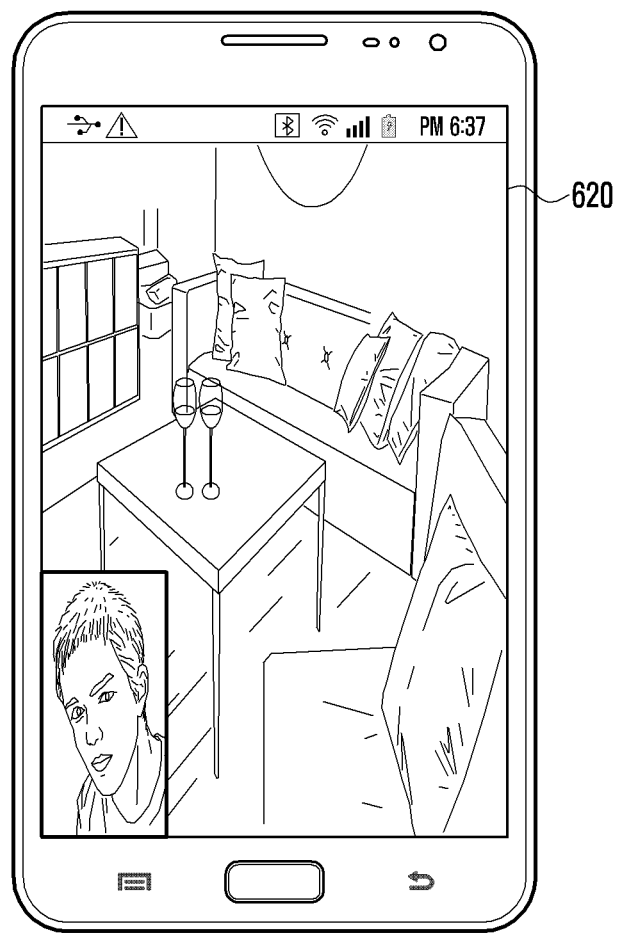

FIG. 6B illustrates image data 620 displayed on the electronic device.

When the camera 410 is activated, a captured image may be displayed on the display 480. When the electronic device 400 and the external device 500 are connected through bidirectional communication, the processor 460 may mix the image data captured by the camera 410 with external image data received from the external device 500 and then output the mixed image data. As shown, the mixed image is displayed in the form of PIP on the display 480. When the electronic device 400 and the external device 500 are connected through unidirectional communication, the external image data is not received from the external device 500, and thus, the electronic device 500 may display the image data captured by the camera 410.

The processor 460 may determine parameters (e.g., a resolution, a frame rate, etc.) associated with the captured image data to be displayed on the display 480 depending on a user's setting. For example, if the user's setting indicates that an image is displayed with the same quality as that of an image to be displayed on the external device 500, the processor 460 may control displaying the image data to which the second quality is applied depending on the QoS algorithm. If the user's setting indicates that an image is displayed with the same quality as that of an image to be stored in the memory, the processor 460 may control displaying the image data to which the first quality is applied.

Figure 6C:
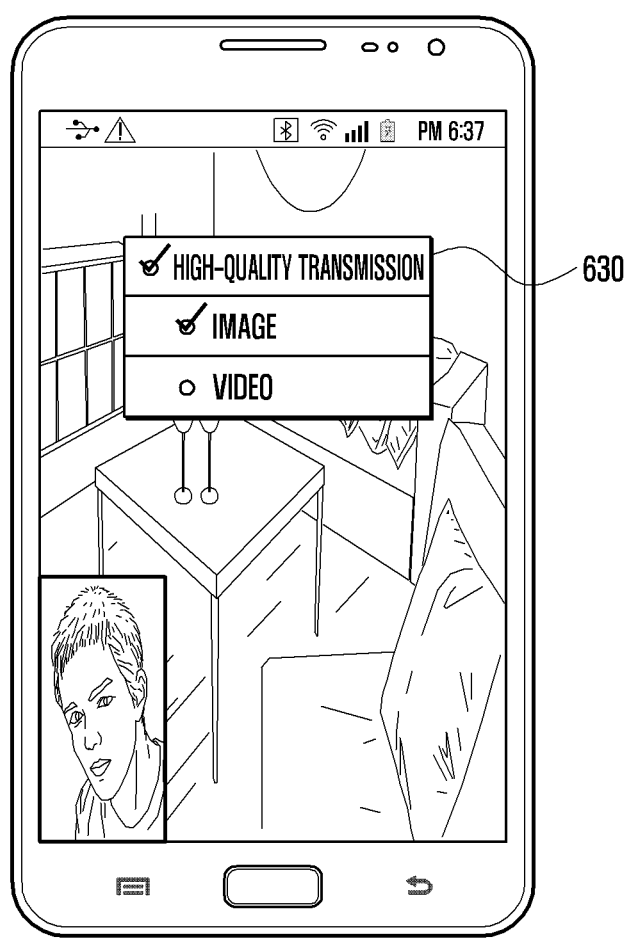

FIG. 6C illustrates a menu that allows a user to select the transmission of high quality data during a real-time transmission of the image data.

As described above, the electronic device 400 may determine the second quality by applying the QoS algorithm in real time based on the network information. Therefore, when the network environment is poor, a real-time seamless transmission of a high-quality image is not allowed. However, a user of the external device 500 may often desire to watch a high-quality image.

In this case, the processor 460 of the electronic device 400 may display the menu 630 for allowing a user to select the high-quality transmission during the transmission of the second encoded data to which the second quality is applied in real time. If the high-quality transmission is selected on the menu 630, a sub-menu for selecting one of an image and a video may be displayed.

When the high-quality transmission is selected, the processor 460 may capture and transmit an image having a high resolution or transmit a short-time video having a high resolution and/or frame rate to the external device 500 through a transmission stream.

Figure 6D:
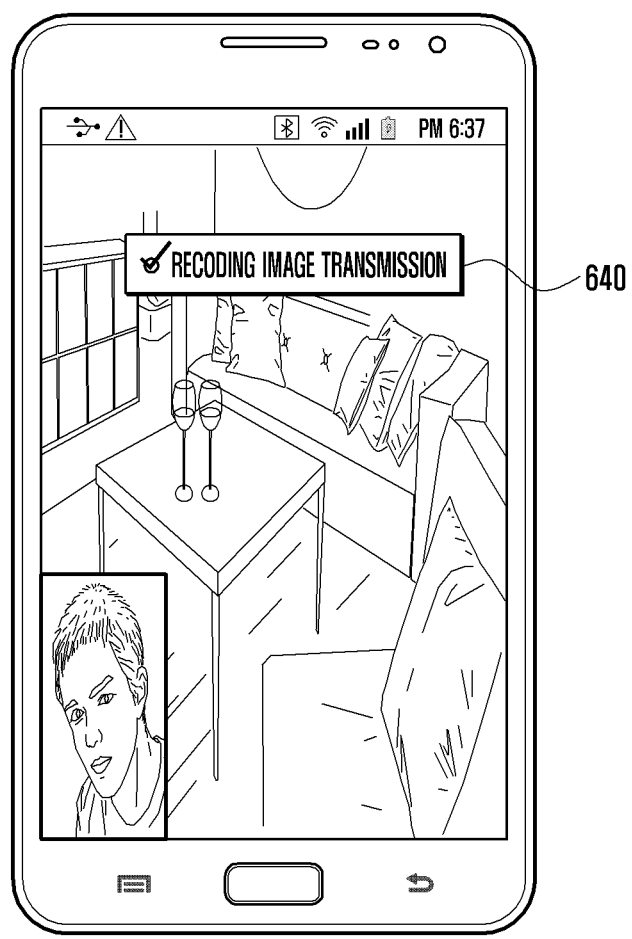

FIG. 6D illustrates a menu for selecting whether to transmit a recorded image after a real-time transmission of image data is completed.

As described above, the image for recording may be stored in the memory 440 as the first encoded data to which the first parameter is applied in response to a user's selection, so it is possible to store a high-quality image. Even though a real-time transmission of a high-quality image is not allowed depending on the network environment, it is possible to transmit the stored high-quality image after a real-time connection is terminated.

Therefore, when the connection with the external device 500 for image transmission is terminated, the processor 460 may display, on the display 480, a menu 640 for selecting whether to transmit the first encoded data stored in the memory 440 to the external device 500. Depending on a user's input through the menu 640, the electronic device 400 may transmit the first encoded data stored in the memory 440 to the external device 500 through a transmission stream.

According to embodiments of the present disclosure, a transmitted high-quality image may be stored in the external device 500 and then displayed at a desired time.

An electronic device according to various embodiments of this disclosure may include a housing; a camera disposed in the housing and configured to create image data; an encoder disposed in the housing and configured to encode at least part of the image data; a communication circuit disposed in the housing and configured to perform a wired and/or wireless communication with an external device; a processor disposed in the housing and electrically connected with the camera, the encoder, and the communication circuit; and a nonvolatile memory disposed in the housing and electrically connected with the processor. In this electronic device, the encoder may be configured to create a first encoded image data by encoding at least part of the image data in a first manner, and to create a second encoded image data by encoding the at least part of the image data in a second manner being different from the first manner. Additionally, the memory may store instructions causing, when executed, the processor to store the first encoded data in the memory and to transmit the second encoded data to an external device through the communication circuit.

According to various embodiments, the first and second manners may be different from each other in at least one of a resolution, a frame rate, and a compression ratio which are required for encoding the image data.

According to various embodiments, the first encoded data may have a first quality and the second encoded data may have a second quality being lower than the first quality.

According to various embodiments, the first quality may include at least one value of a first resolution, a first frame rate, and a first compression ratio, and the second quality may include at least one value of a second resolution, a second frame rate, and a second compression ratio, the at least one value of the second quality being smaller than the at least one value of the first quality.

According to various embodiments, the first quality may be predetermined by a user's selection.

According to various embodiments, the second quality may be determined based on a communication quality between the communication circuit and the external device.

According to various embodiments, the instructions may cause the processor to change the second quality in real time according to network information received through the communication circuit.

According to various embodiments, the first manner may include a use of a first encoding algorithm, and the second manner may include a use of a second encoding algorithm being different from the first encoding algorithm.

According to various embodiments, at least part of functions of the encoder may be performed by the processor.

According to various embodiments, the instructions may cause the processor to transmit the first encoded data stored in the memory to the external device after the second encoded data is transmitted to the external device.

Figure 7:
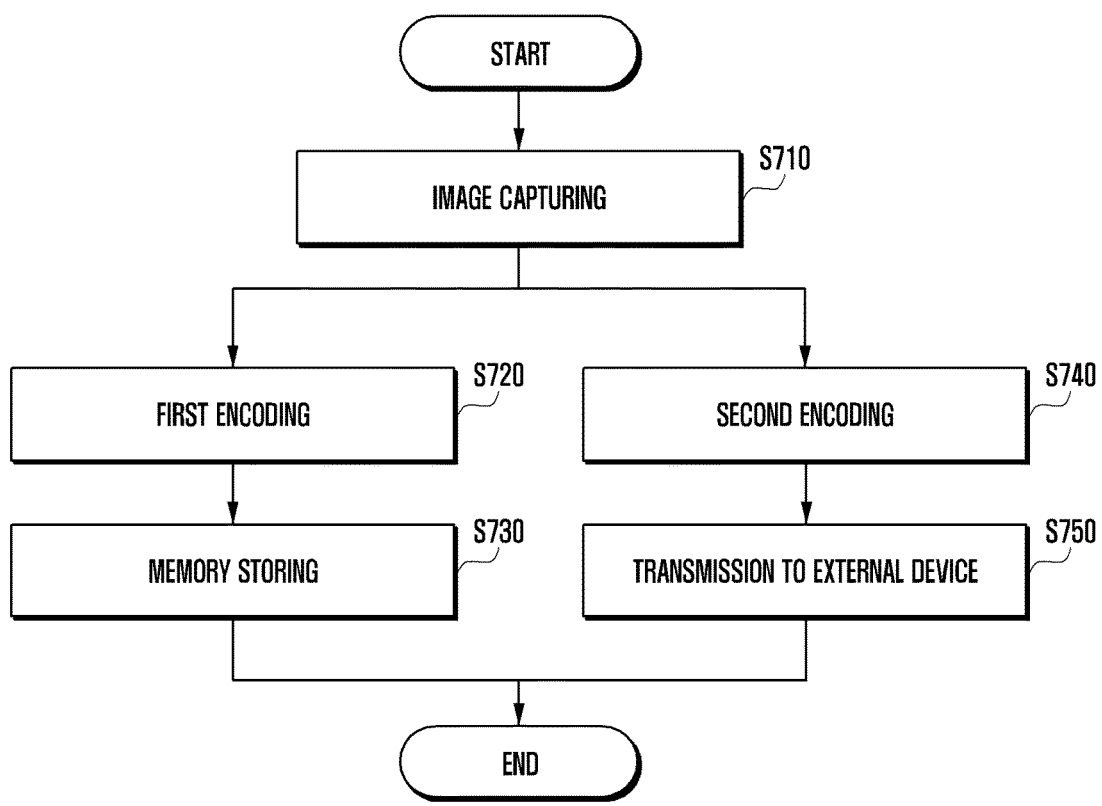
FIGS. 7 and 8 are flow diagrams illustrating an image data encoding method of an electronic device, according to an embodiment of the present disclosure.

FIG. 7 is a flow diagram illustrating an image data encoding method of an electronic device, according to an embodiment of the present disclosure.

This method may be performed by the electronic device described above in FIGS. 1 to 6.

In step S710, the electronic device creates image data by capturing a subject through the camera. The created image data may be encoded for recording and transmission. Specifically, the electronic device may encode the image data, simultaneously or sequentially, in separate individual operations. Hereinafter, steps S720 and S730 include encoding and storing the image data for recording, and step S740 and S750 include encoding and transmitting the image data for transmission to the network.

At step S720, the electronic device encodes the image data in a first manner, and thereby creates the first encoded data.

Independent from step S720, in step S740, the electronic device encodes the image data in a second manner, and thereby creates the second encoded data.

According to various embodiments, the first and second manners may be different from each other in at least one of a resolution, a frame rate, and a compression ratio, which are required for encoding the image data. Additionally, the first encoded data may have a first quality and the second encoded data may have a second quality, which is lower than the first quality.

In step S730, the electronic device stores the first encoded data in the memory.

In step S750, the electronic device transmits the second encoded data to the external device through the network.

Figure 8:
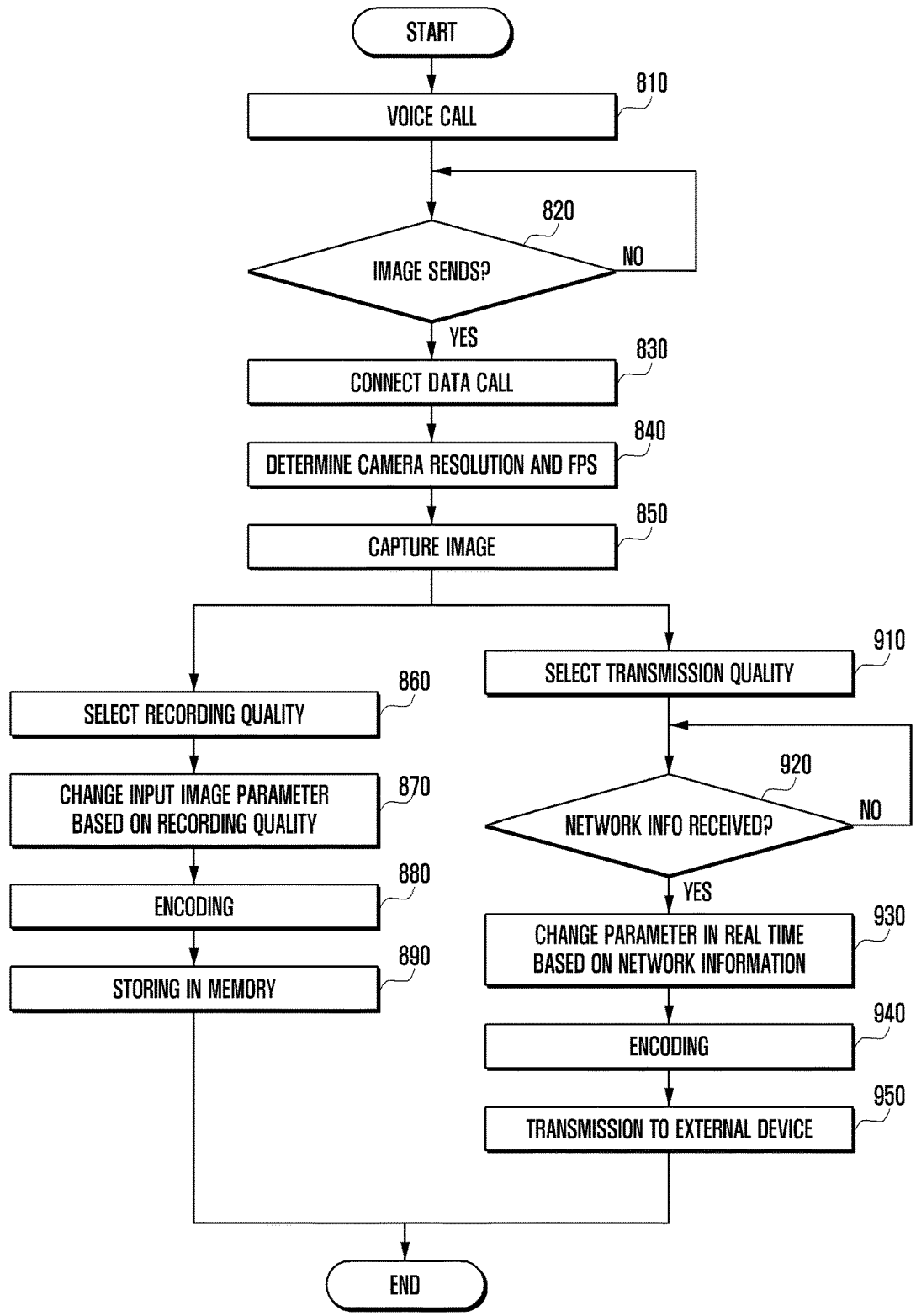

FIG. 8 is a flow diagram illustrating an image data encoding method of an electronic device, according to an embodiment of the present disclosure.

In step 810, the electronic device connects a voice call with the external device and performs a voice call.

In step 820, while the voice call is performed, the electronic device determines whether it receives a user's request for transmission of a captured image, such as by pressing a specific button.

When it is determined that the user's request is received, in step 830, in response to the user's request, the electronic device connects a data call with the external device so as to initiate a subsequent process of capturing, encoding, storing, and transmitting.

In step 840, the electronic device determines a resolution and frame rate of the camera. Specifically, the electronic device may select the resolution and/or the frame rate of the captured image data in response to user's setting through an option menu, depending on a network environment, or as default setting.

Since camera-related parameters such as a resolution and a frame rate may not be changed while the camera is operating, the electronic device may operate the camera module according to predetermined parameters. Normally, in case of resizing the image data from a high resolution to a low resolution, the image quality may be lowered in comparison with encoding at a low quality. It is therefore required to properly adjust parameters, to be used for operating the camera, depending on transmission environments. According to various embodiments, considering both a recording quality for storing and a QoS for transmission, the camera resolution and FPS may be set.

The electronic device, according to various embodiments, may set the camera to capture an ultra high-quality image and then, when real-time image transmission is connected, may change setting of the camera to capture an image having a lowered quality depending on the network environment. Additionally, the electronic device may set the camera to capture a high-quality image and, in response to a user's selection, may change the setting of the camera to capture an image having an increased quality.

In step 850, the electronic device captures an image with the determined resolution and frame rate, and thereby creates image data. Also, the electronic device may mix images captured respectively by the front and rear cameras.

The captured image data created by the electronic device may be encoded for recording and encoded for transmission. Specifically, the electronic device may encode the image data, simultaneously or sequentially, in separate individual operations. Hereinafter, steps 860 to 890 include encoding and storing the image data for recording, and steps 910 to 950 include encoding and transmitting the image data for transmission to the network.

In step 860, the electronic device receives a user input for selecting a recording quality of the image data. The electronic device may provide an option menu for allowing a user to select at least one parameter of the first quality. The option menu may allow a user to directly enter a desired value regarding a resolution, a frame rate, etc., and/or allow a user to select one of predetermined levels such as a ultra high quality, a high quality, and a normal quality, each of which defines in advance parameters such as a resolution, a frame rate, and the like. Step 860 is not necessarily performed only after step 850 and may be performed before the initiation of a voice call (i.e., before step 810). Additionally, it is possible for a user to frequently change a recording quality through an option menu while an image transmission continues.

In step 870, the electronic device sets the first quality depending on the selected recording quality.

In step 880, the electronic device encodes the image data by applying the first quality and thereby create the first encoded data. The first quality is a parameter associated with an input image and a parameter regarding encoder setting values and may include at least one of the first resolution, first frame rate, and first compression ratio of the first encoded data.

In step 890, the electronic device stores the created first encoded data in the memory. The memory may be an embedded memory or an external memory.

In step 910, the electronic device may receive a user's selection for a transmission quality of image data. Specifically, the electronic device may provide an option menu for selecting a transmission service quality (e.g., one of high, mid, and low).

When the data call is connected, the electronic device may determine the second quality depending on the initially determined transmission service quality, encode the image data by applying the second quality, and create the second encoded data. The second quality may include at least one value of the second resolution, the second frame rate, and the second compression ratio each of which is smaller than that of the first quality.

In step 920, the electronic device determines whether network information is received from the network. The network information may include an uplink data transmission rate of the electronic device. The electronic device may transmit data on uplink to the network according to a real-time protocol (RTP), receive a real-time transport control protocol (RTCP) message from the network, and recognize the network information through the RTCP message.

When network information is received, in step 930, the electronic device changes the second quality in real time depending on the received network information. In step 940, the electronic device encodes the image data on the basis of the changed second quality.

For example, if any image data is captured to have an FHD resolution and a frame rate of 30 fps and if a user sets the transmission service quality as high, the encoder may create the second encoded data by applying a low compression ratio to the image having an FHD resolution and a frame rate of 30 fps. The electronic device may check the network information in the RTCP message during the transmission of the second encoded data and, if the network environment is not good, may set each parameter of the second quality as a lower value. Therefore, the electronic device may create the second encoded data having a lower quality, for example, by changing a resolution from FHD to HD, changing a frame rate from 30 fps to 24 fps, increasing a compression ratio (i.e., increasing bps), and applying intra-frame (I frame) refresh.

In step 950, the electronic device transmits the second encoded data to the external device through the network.

An image data encoding method in an electronic device according to various embodiments of this disclosure may include operations of creating image data by using a camera; creating a first encoded image data by encoding at least part of the image data in a first manner; creating a second encoded image data by encoding the at least part of the image data in a second manner being different from the first manner; storing the first encoded data in the memory; and transmitting the second encoded data to an external device.

According to various embodiments, the first and second manners may be different from each other in at least one of a resolution, a frame rate, and a compression ratio which are required for encoding the image data.

According to various embodiments, the first encoded data may have a first quality and the second encoded data may have a second quality being lower than the first quality.

According to various embodiments, the first quality may include at least one value of a first resolution, a first frame rate, and a first compression ratio, and the second quality may include at least one value of a second resolution, a second frame rate, and a second compression ratio, the at least one value of the second quality being smaller than the at least one value of the first quality.

According to various embodiments, the first quality may be predetermined by a user's selection.

According to various embodiments, the second quality may be determined based on a communication quality between the communication circuit and the external device.

According to various embodiments, the operation of creating the second encoded data may include operation of changing the second quality in real time according to network information received.

According to various embodiments, the first manner may include a use of a first encoding algorithm, and the second manner may include a use of a second encoding algorithm being different from the first encoding algorithm.

According to various embodiments, at least part of encoding operations may be performed by a processor of the electronic device.

According to various embodiments, the method may further include operation of, after transmitting the second encoded data to the external device, transmitting the first encoded data stored in the memory to the external device.

According to the above-discussed various embodiments of this disclosure, it is possible to provide an electronic device and image data encoding method capable of recording a high-quality image data without depending on network environments.

While the disclosure has been shown and described with reference to certain embodiment thereof, it will be understood by those skilled in the art that various changes in form and details may be made therein without departing from the spirit and scope of the disclosure as defined by the appended claims.

What is claimed is:

1. An electronic device comprising:
    a housing;
    a camera disposed in the housing and configured to capture an image and create image data;
    an encoder disposed in the housing and configured to encode at least a portion of the image data;
    a communication circuit disposed in the housing and configured to perform communication with an external device;
    a processor disposed in the housing and electrically connected with the camera, the encoder, and the communication circuit; and
    a nonvolatile memory disposed in the housing and electrically connected with the processor,
    wherein the encoder is further configured to create first encoded image data having a first quality by encoding the at least a portion of the image data in a first manner, and to create second encoded image data having a second quality by encoding the at least a portion of the image data in a second manner, the second manner being different from the first manner,
    wherein the memory stores instructions, which—when executed, cause the processor to store the first encoded data in the memory and to transmit the second encoded data to the external device through the communication circuit, and wherein the first quality of the first encoded data stored in the memory is higher than the second quality of the second encoded data transmitted to the external device.

2. The electronic device of claim 1, wherein the first manner and the second manner differ—in at least one of resolution, frame rate, and compression ratio, which are required for encoding the image data.

3. The electronic device of claim 1, wherein the first quality comprises at least one of a first resolution, a first frame rate, and a first compression ratio, and the second quality includes at least one of a second resolution, a second frame rate, and a second compression ratio.

4. The electronic device of claim 1, wherein the first quality is predetermined by a selection of a user of the electronic device.

5. The electronic device of claim 1, wherein the second quality is determined based on a communication quality between the communication circuit and the external device.

6. The electronic device of claim 5, wherein the instructions cause the processor to change the second quality in real time according to network information received through the communication circuit.

7. The electronic device of claim 1, wherein the first manner includes a use of a first encoding algorithm, and the second manner includes a use of a second encoding algorithm, the second encoding algorithm being different from the first encoding algorithm.

8. The electronic device of claim 1, wherein one or more functions of the encoder are performed by the processor.

9. The electronic device of claim 1, wherein the instructions cause the processor to transmit the first encoded data stored in the memory to the external device after the second encoded data is transmitted to the external device.

10. An image data encoding method in an electronic device, the method comprising operations of:
  creating image data using at least one image captured by a camera of the electronic device;
  creating first encoded image data having a first quality by encoding at least a portion of the image data in a first manner;
  creating second encoded image data having a second quality by encoding the at least a portion of the image data in a second manner, the second manner being different from the first manner;
  storing the first encoded data in a memory of the electronic device; and
  transmitting the second encoded data from the electronic device to an external device,
  wherein the first quality of the first encoded data stored in the memory is higher than the second quality of the second encoded data transmitted to the external device.

11. The method of claim 10, wherein the first manner and the second manner differ in at least one of resolution, frame rate, and compression ratio, which are required for encoding the image data.

12. The method of claim 10, wherein the first quality comprises at least one of a first resolution, a first frame rate, and a first compression ratio, and the second quality includes at least one of a second resolution, a second frame rate, and a second compression ratio.

13. The method of claim 10, wherein the first quality is predetermined by a selection of a user of the electronic device.

14. The method of claim 10, wherein the second quality is determined based on a communication quality between the communication circuit and the external device.

15. The method of claim 14, wherein the operation of creating the second encoded data includes operation of changing the second quality in real time according to network information received.

16. The method of claim 10, wherein the first manner includes a use of a first encoding algorithm, and the second manner includes a use of a second encoding algorithm, the second encoding algorithm being different from the first encoding algorithm.

17. The method of claim 10, wherein one or more encoding operations are performed by a processor of the electronic device.

18. The method of claim 10, further comprising:
  transmitting the first encoded data stored in the memory to the external device after the second encoded data is transmitted to the external device.

* * * * *